US009759290B2

(12) United States Patent
Glover et al.

(10) Patent No.: US 9,759,290 B2
(45) Date of Patent: Sep. 12, 2017

(54) GEARBOX

(71) Applicant: McLaren Automotive Limited, Woking, Surrey (GB)

(72) Inventors: Antony Richard Glover, Woking (GB); Richard Hopkirk, Woking (GB)

(73) Assignee: McLaren Automotive Limited, Woking, Surrey (GB)

( * ) Notice: Subject to any disclaimer, the term of this patent is extended or adjusted under 35 U.S.C. 154(b) by 262 days.

(21) Appl. No.: 14/417,503

(22) PCT Filed: Jul. 29, 2013

(86) PCT No.: PCT/EP2013/065915
§ 371 (c)(1),
(2) Date: Jan. 26, 2015

(87) PCT Pub. No.: WO2014/016435
PCT Pub. Date: Jan. 30, 2014

(65) Prior Publication Data
US 2016/0053863 A1 Feb. 25, 2016

(30) Foreign Application Priority Data
Jul. 27, 2012 (GB) .................................. 1213466.4

(51) Int. Cl.
F16H 3/08 (2006.01)
F16H 3/097 (2006.01)
(Continued)

(52) U.S. Cl.
CPC ............ F16H 3/097 (2013.01); B60K 6/365 (2013.01); B60K 6/44 (2013.01); B60K 6/46 (2013.01);
(Continued)

(58) Field of Classification Search
CPC .. F16H 3/006; F16H 2003/0931; F16H 3/091; F16H 47/02
(Continued)

(56) References Cited

U.S. PATENT DOCUMENTS 4,096,932 A 6/1978 Liberty, Jr.
7,604,561 B2 * 10/2009 Earhart ................... F16H 37/04
475/218
(Continued)

FOREIGN PATENT DOCUMENTS

DE 10249829 A1 4/2004
DE 102010063582 A1 6/2012
(Continued)

OTHER PUBLICATIONS

Intellectual Property Office, Search Report under Section 17(5) for Application No. GB1213466.4, Oct. 3, 2012, 5 pages, Great Britain.
(Continued)

Primary Examiner — Ha D Ho
(74) Attorney, Agent, or Firm — Alston & Bird LLP

(57) ABSTRACT

A gearbox comprising: a first shaft (2) and a second shaft (1), one of the first and second shafts being an input shaft (1) for receiving a drive torque and the other being an output shaft (2) for providing a drive torque; two intermediate shafts (6, 7) by means of which the first and second shafts (2, 1) can be coupled together, each intermediate shaft being arranged so that: (a) it can be coupled to the first shaft (2) via a respective first torque path at any of a plurality of gear ratios (1st-8th), or the respective first torque path can be disengaged; and (b) it can be coupled to the second shaft (1) via a respective second torque path, or the respective second torque path can be disengaged; and a differential torque device (50) coupled between the intermediate shafts (6, 7), the differential torque device (50) being capable of trans-
(Continued)

mitting a differential torque between the intermediate shafts (6, 7).

52 Claims, 3 Drawing Sheets

(51) Int. Cl.

| | |
|---|---|
| *B60K 6/365* | (2007.10) |
| *B60K 6/44* | (2007.10) |
| *B60W 30/19* | (2012.01) |
| *F16H 61/04* | (2006.01) |
| *F16D 41/04* | (2006.01) |
| *F16H 3/12* | (2006.01) |
| *F16H 3/72* | (2006.01) |
| *F16H 37/08* | (2006.01) |
| *B60K 6/485* | (2007.10) |
| *B60W 10/08* | (2006.01) |
| *B60K 6/46* | (2007.10) |
| *F16H 3/10* | (2006.01) |
| *F16H 63/30* | (2006.01) |
| *F16H 3/00* | (2006.01) |

(52) U.S. Cl.
CPC ............ *B60K 6/485* (2013.01); *B60W 10/08* (2013.01); *B60W 30/19* (2013.01); *F16D 41/04* (2013.01); *F16H 3/006* (2013.01); *F16H 3/10* (2013.01); *F16H 3/12* (2013.01); *F16H 3/126* (2013.01); *F16H 3/724* (2013.01); *F16H 37/0833* (2013.01); *F16H 61/04* (2013.01); *F16H 61/0403* (2013.01); *B60Y 2400/74* (2013.01); *F16H 2003/008* (2013.01); *F16H 2003/0811* (2013.01); *F16H 2061/0422* (2013.01); *F16H 2061/0433* (2013.01); *F16H 2063/3093* (2013.01); *F16H 2200/006* (2013.01); *F16H 2306/46* (2013.01); *Y02T 10/6226* (2013.01); *Y10S 903/91* (2013.01)

(58) Field of Classification Search
USPC .......................... 74/330, 331, 333, 340, 661
See application file for complete search history.

(56) References Cited

U.S. PATENT DOCUMENTS

| | | | |
|---|---|---|---|
| 8,075,437 B2* | 12/2011 | Rodgers, II | ........... F16H 37/046 475/211 |
| 8,146,451 B2* | 4/2012 | Van Druten | ............ F16H 3/095 74/330 |
| 2006/0025272 A1 | 2/2006 | Pelouch | |
| 2008/0045373 A1 | 2/2008 | Rodgers, II | |
| 2011/0072923 A1 | 3/2011 | Dittrich et al. | |
| 2012/0035013 A1 | 2/2012 | Appeltauer | |
| 2013/0267367 A1 | 10/2013 | Kaltenbach et al. | |

FOREIGN PATENT DOCUMENTS

| | | | |
|---|---|---|---|
| EP | 1429049 | A1 | 6/2004 |
| EP | 1541900 | A2 | 6/2005 |
| EP | 1826462 | A2 | 8/2007 |
| EP | 1995494 | A1 | 11/2008 |
| EP | 2325511 | A1 | 5/2011 |
| EP | 2407688 | A1 | 1/2012 |
| EP | 2578901 | A1 | 4/2013 |
| FR | 2956175 | A1 | 8/2011 |
| GB | 1232341 | A | 5/1971 |
| GB | 1295135 | A | 11/1972 |
| GB | 2110324 | A | 6/1983 |
| WO | WO 2011/152374 | A1 | 12/2011 |

OTHER PUBLICATIONS

Intellectual Property Office, Search Report under Section 17(6) for Application No. GB1213466.4, Jan. 15, 2013, 3 pages, Great Britain.
International Searching Authority, International Search Report for International Application No. PCT/EP2013/065915, Jan. 20, 2014, 8 pages, European Patent Office, The Netherlands.

* cited by examiner

GEARBOX

CROSS REFERENCE TO RELATED APPLICATIONS

This application is a National Stage Application, filed under 35 U.S.C. §371, of International Application No. PCT/EP2013/065915, filed Jul. 29, 2013, which claims priority to Great British Application No. 1213466.4, filed Jul. 27, 2012; the contents of both of which as are hereby incorporated by reference in their entirety.

BACKGROUND

Related Field

This invention relates to gearboxes, for example for use in vehicle transmissions.

In both static machines and vehicles it can be desirable to transmit rotation from one or more drive sources to an output shaft. It is conventional to interpose a gearbox between the drive source and the output shaft to increase the range of speeds and/or torques available at the output shaft. The gearbox allows a user to select the gear ratio between the drive source and the output shaft.

Description of Related Art

In one type of gearbox drive is applied from a drive source to two intermediate shafts. Each intermediate shaft can be coupled to a common output shaft at a variety of gear ratios. By convention the gears are numbered in order, with first gear being the lowest gear. Normally, one of the intermediate shafts carries the odd gears and the other of the intermediate shafts carries the even gears. Typically two friction clutches are provided to allow each of the intermediate shafts to be driven independently and provide the ability to maintain drive torque during upshifts. One example of such a gearbox is disclosed in US 2012/0035013.

It would be desirable to maintain the quality of gear shifts in such gearboxes whilst improving the mechanical efficiency and reducing the size and weight of such gearboxes.

BRIEF SUMMARY

According to one aspect of the present invention there is provided a gearbox comprising: a first shaft and a second shaft, one of the first and second shafts being an input shaft for receiving a drive torque and the other being an output shaft for providing a drive torque; two intermediate shafts by means of which the first and second shafts can be coupled together, each intermediate shaft being arranged so that: (a) it can be coupled to the first shaft via a respective first torque path at any of a plurality of gear ratios, or the respective first torque path can be disengaged; and (b) it can be coupled to the second shaft via a respective second torque path, or the respective second torque path can be disengaged; and a differential torque device coupled between the intermediate shafts, the differential torque device being capable of transmitting a differential torque between the intermediate shafts; and a coupling that can be actuated to hold one of the intermediate shafts stationary.

When actuated, the coupling that can be actuated to hold one of the intermediate shafts stationary preferably couples that shaft to hold it stationary relative to a housing of the gearbox and/or relative to mounts by which the gearbox can be mounted, e.g. in a vehicle. There may be two such couplings, each one of which is capable of holding a respective one of the intermediate shafts stationary. In other embodiments the coupling that can be actuated to hold one of the intermediate shafts stationary could be omitted.

According to a second aspect of the present invention there is provided a gearbox comprising: a first shaft and a second shaft, one of the first and second shafts being an input shaft for receiving a drive torque and the other being an output shaft for providing a drive torque; two intermediate shafts by means of which the first and second shafts can be coupled together, each intermediate shaft being arranged so that: (a) it can be coupled to the first shaft via a respective first torque path at any of a plurality of gear ratios, or the respective first torque path can be disengaged; and (b) it can be coupled to the second shaft via a respective second torque path, or the respective second torque path can be disengaged; and a differential torque device coupled between the intermediate shafts, the differential torque device being capable of transmitting a differential torque between the intermediate shafts and an electric motor coupled to the input shaft to provide a drive torque thereto.

The first shaft could be an input shaft for receiving a drive torque and the second shaft could be an output for providing a drive torque. Alternatively the second shaft could be an input shaft for receiving a drive torque and the first shaft could be an output for providing a drive torque. In some applications the first and second shafts could perform both roles from time to time. For example, the gearbox could be employed in a vehicle whose drive wheels could normally be driven from, for instance, the first shaft but could provide drive to the second shaft for regenerative braking.

The differential torque device could be a differential gear device such as a differential. The differential gear device could be coupled to a torque provider/absorber. Conveniently the torque provider/absorber can apply a torque to a rotatable component of the differential gear device. The differential gear device may have a first element coupled to the first intermediate shaft, a second element coupled to the second intermediate shaft and a third element coupled to the torque provider/absorber. The first, second and third elements may be geared together so that by the torque provider/absorber providing/absorbing torque the differential torque device can transfer torque across a speed difference between the intermediate shafts.

The first element may be one of a sun wheel and an outer ring. The second element may be the other of the sun wheel and the outer ring. The third element may be a planet cage carrying planet gears that engage the sun wheel and the outer ring.

The torque provider/absorber may comprise a first motor. That could, for example, be a hydraulic or an electric motor. The torque provider/absorber may comprise a clutch whereby the first motor can be selectively decoupled from the differential torque device. The torque provider/absorber may comprise a brake. The brake may be a friction brake. The gearbox may be configured to perform a shift operation including the step of absorbing torque from a rotatable component of the differential gearbox device by means of the brake.

An internal combustion engine may be coupled to the input shaft to provide a drive torque thereto.

There may be a second motor coupled to the second shaft to provide a drive torque thereto and/or receive a drive torque therefrom. That could, for example, be a hydraulic or an electric motor.

The gear ratios with which each intermediate shaft can be coupled to the first shaft may be such that the intermediate shafts can collectively couple the second shaft to the first shaft independently of the differential torque device at a range of gear ratios. Successive ratios in that range may be provided by alternate ones of the intermediate shafts.

The respective first torque paths may each comprise a respective gear which can be rotationally locked to a respective one of the intermediate shafts by means of a respective coupling/locking mechanism. One or more of the coupling mechanisms may be such that when its respective gear is transmitting torque to or from its respective shaft the coupling mechanism is loaded so as to resist its disengagement. One or more of the coupling mechanisms could be dog clutches. The gearbox may be configured so as to, when it is desired to shift from a first gear ratio provided by a first one of the said gears on one intermediate shaft to a second gear ratio provided by a second one of the said gears on the other intermediate shaft, apply a light release load to the locking mechanism of the first gear, the light load being insufficient to cause unlocking of the first gear when it is transmitting torque, but sufficient to cause unlocking of the first gear when it becomes unloaded due to drive being taken up through the clutch as the shift is made.

The coupling mechanism may be capable of applying a torque between the said intermediate shaft and the first shaft in only a single direction. The coupling mechanism may be a further clutch, for example a dog clutch. The coupling mechanism may comprise an engagement mechanism for engaging and disengaging the further clutch. The further clutch and the engagement mechanism may be capable of operating in: a first clutch mode in which the coupling mechanism is capable of applying a torque between the said intermediate shaft and the first shaft in both directions; a second clutch mode in which the coupling mechanism is capable of applying a torque between the said intermediate shaft and the first shaft in only a single direction; and a third clutch mode in which the coupling mechanism is capable of applying a torque between the said intermediate shaft and the first shaft in neither direction.

The gearbox may be capable of operating in a first mode in which an intermediate shaft is coupled to the first shaft and to the second shaft and torque can be transmitted between the first shaft and the second shaft independently of the differential torque device.

The gearbox may be capable of operating in a second mode in which an intermediate shaft is coupled to the first shaft and to the second shaft and torque can be transmitted through the planetary gear arrangement between the torque provider/absorber and the first shaft.

The gearbox may be capable of, when it is operating in the second mode, restraining the intermediate shaft that is not coupled to the first shaft so that the torque provider/absorber can act against that intermediate shaft to provide/absorb torque to/from the first shaft.

The gearbox may be capable of operating in a third mode in which both intermediate shafts are decoupled from the second shaft, both intermediate shafts are coupled to the first shaft and torque can be transmitted through the differential torque device between the torque provider/absorber and the first shaft.

The gearbox may be capable of operating in a fourth mode in which a one of the intermediate shafts is coupled to the second shaft and decoupled from the first shaft, the other of the intermediate shafts is decoupled from the second shaft and coupled to the first shaft and torque can be transmitted between the first shaft and the second shaft through the torque provider/absorber.

The gearbox may comprise a controller configured to, when the gearbox is operating in the fourth mode, control the speed of the torque provider/absorber to control the gear ratio between the first shaft and the second shaft.

The gearbox may be capable of operating in a fifth mode in which the coupling that can be actuated to hold one of the intermediate shafts stationary is actuated to hold that intermediate shaft stationary, that intermediate shaft is decoupled from the first shaft, the other intermediate shaft is coupled to the first shaft and at least one of the intermediate shafts is decoupled from the second shaft, and in which torque can be transmitted through the differential torque device between the torque provider/absorber and the first shaft.

The gearbox may be configured to, when the gearbox is in the fifth mode and a transition to the fourth mode is initiated: couple the intermediate shaft that is held stationary to the second shaft, then allow the second motor to take up reaction torque, then release that intermediate shaft from the coupling which has been holding it stationary.

The gearbox may be configured to, when the gearbox is in the fifth mode and a transition to the first mode is initiated: set the second shaft to rotate at the same speed as the rotating intermediate shaft, then couple that rotating intermediate shaft to the second shaft, then transfer drive torque from the torque provider/absorber to the second shaft, then release the other intermediate shaft from the coupling which has been holding it stationary, then synchronise the two intermediate shafts, then couple the other intermediate shaft to the second shaft.

The gearbox may be configured to, when the gearbox is in the third mode and a transition to the first mode is initiated: set the second shaft to rotate at the same speed as an intermediate shaft, then couple that intermediate shaft to the second shaft, then transfer drive torque from the torque provider/absorber to the second shaft, then decouple the other intermediate shaft from the output shaft, then synchronise the two intermediate shafts, then couple the other intermediate shaft to the second shaft.

The gearbox may be configured to, when the gearbox is in the third mode and a transition to the fourth mode is initiated: set the second shaft to rotate at the same speed as an intermediate shaft, then couple that intermediate shaft to the second shaft, then apply appropriate torque via the second shaft to unload the coupling from that intermediate shaft to the first shaft, and simultaneously adjust torque at the torque provider/absorber to maintain output torque, then decouple that intermediate shaft from the first shaft.

The gearbox may be configured to, when the gearbox is in the fourth mode with the intermediate shaft coupled to the input having a coupling that can be actuated to hold it stationary, and a transition to the fifth mode is initiated: reduce the speed of rotation of the ICE to zero and simultaneously increase the torque on the torque provider/absorber, using the second motor to ensure that drive is maintained at the output shaft, then actuate the coupling to hold the intermediate shaft coupled to the input shaft stationary, then decouple that intermediate shaft from the input shaft.

The gearbox may be configured to, when the gearbox is in the fourth mode and a transition to the third mode is initiated: adjust the speed of rotation of the second shaft such that the intermediate shaft coupled to the second shaft is rotating at the same speed as the first shaft, then couple that intermediate shaft to the first shaft, then reduce the torque on the second shaft to zero and simultaneously increase the torque on the torque provider/absorber such that drive is maintained at the first shaft, then decouple that intermediate shaft from the second shaft.

The gearbox may be configured to, when the gearbox is in the fourth mode and a transition to the first mode is initiated: adjust the speed of rotation of the second shaft such that it is the same as that of the intermediate shaft coupled to the first shaft, then couple that intermediate shaft to the second shaft, then remove torque from the torque provider/absorber.

The gearbox may be configured to, when the gearbox is in the first mode and a transition to the fourth mode is initiated: take up torque at the torque provider/absorber to unload the intermediate shaft coupled to the first shaft, then decouple that intermediate shaft from the second shaft.

The gearbox may be configured to, when the gearbox is in the first mode with one intermediate shaft coupled to both the first and second shafts and the other intermediate shaft coupled to the second shaft but not the first shaft and having a coupling that can be actuated to hold it stationary, and a transition to the fifth mode is initiated: decouple from the second shaft the intermediate shaft that is not coupled to the first shaft, then halt that intermediate shaft using the torque provider/absorber, then actuate the coupling to hold that intermediate shaft stationary, then take up the drive torque with the torque provider/absorber, then unload the intermediate shaft coupled to both the first and second shafts using the torque provider/absorber, then decouple that intermediate shaft from the second shaft.

The gearbox may be configured to, when the gearbox is in the first mode with one intermediate shaft coupled to both the first and second shafts and the other intermediate shaft coupled to the second shaft but not the first shaft and a transition to the third mode is initiated: decouple the intermediate shaft not coupled to the first shaft from the second shaft, then use the torque provider/absorber to adjust the speed of rotation of that intermediate shaft such that it is the same as that of the first shaft, then couple that intermediate shaft to the first shaft, then take up the drive torque with the torque provider/absorber, then unload the intermediate shaft coupled to both the first and second shafts using the torque provider/absorber, then decouple that intermediate shaft from the second shaft.

The gearbox may be configured to, when the gearbox is in one of the modes (mode A) and a transition to another of the modes (mode B) is initiated perform any one of the procedures described above for transitioning from mode A to a further mode (mode C) and then any one of the procedures described above for transitioning from mode C to mode B.

The gearbox may be capable of powering one of the first and second motors by means of energy recovered from the other of the first and second motors.

The gearbox may be capable of adding or removing energy to/from an energy store using one or more motors.

Energy may be recovered from a motor coupled to the internal combustion engine. That energy may be used to drive the other motor.

The gearbox may further comprise a clutch arranged between the intermediate shafts. That clutch may be capable of coupling the intermediate shafts together independently of the first and second torque paths. The clutch may be a slippable clutch, e.g. a friction or fluid clutch, as opposed to a dog clutch. It may constitute the differential torque device. The clutch may be capable of coupling the intermediate shafts together with a controllable degree of slip therebetween.

The torque provider/absorber may be coupled to the differential torque device via a clutch, for example a slippable clutch.

According to a second aspect of the present invention there is provided a gearbox comprising: a first shaft and a second shaft, one of the first and second shafts being an input shaft for receiving a drive torque and the other being an output shaft for providing a drive torque; two intermediate shafts by means of which the first and second shafts can be coupled together, each intermediate shaft being arranged so that: (a) it can be coupled to the first shaft via a respective first torque path at any of a plurality of gear ratios, or the respective first torque path can be disengaged; and (b) it can be coupled to the second shaft via a respective second torque path, or the respective second torque path can be disengaged; and a clutch arranged between the intermediate shafts and capable of coupling the intermediate shafts together independently of the first and second torque paths.

According to a third aspect of the present invention there is provided a gearbox comprising: a first shaft and a second shaft, one of the first and second shafts being an input shaft for receiving a drive torque and the other being an output shaft for providing a drive torque; two intermediate shafts by means of which the first and second shafts can be coupled together, each intermediate shaft being arranged so that: (a) it can be coupled to the first shaft via a respective first torque path at any of a plurality of gear ratios, or the respective first torque path can be disengaged; and (b) it can be coupled to the second shaft via a respective second torque path, or the respective second torque path can be disengaged; and a speed synchronisation mechanism arranged between the intermediate shafts and capable of imposing speed synchronisation on the intermediate shafts independently of the first and second torque paths.

The speed synchronisation mechanism may, for instance, be a clutch or a continuously variable transmission ("CVT"). The speed synchronisation mechanism may be capable of operating in a first mode in which it does not impose speed synchronisation on the intermediate shafts and a second mode in which it does impose speed synchronisation on the intermediate shafts. In the first mode it may, if a clutch, be open or, if a CVT, have its transmission ratio freely variable or be disconnected from one or both of the intermediate shafts. In the second mode it may, if a clutch, be closed or, if a CVT, have its transmission ratio fixed.

The speed synchronisation mechanism is preferably capable of imposing speed synchronisation on the intermediate shafts independently of the first and second torque paths by virtue of it providing a torque path between the intermediate shafts that is independent of the first and second torque paths.

Such a clutch may be capable of coupling the intermediate shafts together with a degree of slip therebetween. The degree of slip may be controllable. The clutch may be a friction clutch. Thus in the second mode, the clutch may impose full speed synchronisation when the clutch is fully closed, or may cause the shafts to tend towards speed synchronisation when the clutch is partially closed.

The gear ratio by which each intermediate shaft is linked to the clutch and the gear ratios of the respective second torque paths may be such that when both intermediate shafts are coupled to the second shaft via the respective second torque path the speed difference across the clutch is zero.

The gear ratios with which each intermediate shaft can be coupled to the first shaft may be such that the intermediate shafts can collectively couple the second shaft to the first shaft independently of the clutch at a range of gear ratios. Successive ratios in that range may be provided by alternate ones of the intermediate shafts.

A first plate of the clutch may be coupled to one of the intermediate shafts. A second plate of the clutch may be coupled to the other of the intermediate shafts.

The gearbox may comprise a controller arranged to, when drive is passing from the input shaft to the output shaft via a first gear ratio on a first one of the intermediate shafts, cause the gearbox to perform an upshift by the steps of: engaging a second gear ratio between the second intermediate shaft and the first shaft whilst the second intermediate shaft is disengaged from the second shaft; subsequently imposing speed synchronisation between the first and second intermediate shafts by means of the speed synchronisation mechanism; subsequently disengaging the first gear ratio when drive is taken up at the second gear ratio; and subsequently disengaging the first intermediate shaft from the second shaft, engaging the second intermediate shaft with the second shaft and ceasing to impose synchronisation between the first and second intermediate shafts by means of the speed synchronisation mechanism. The input shaft may be continuously driving the output shaft during this process. Once speed synchronisation is imposed between the shafts, drive between the input shaft and the output shaft may be passing through the speed synchronisation mechanism. If the first gear ratio is provided by a gear releasably coupled by a releasable coupling to one or other of the first intermediate shaft and the first shaft then the step of disengaging the first gear ratio may be performed by loading the releasable coupling towards disengagement whilst the speed synchronisation mechanism is imposing speed synchronisation between the intermediate shafts. That speed synchronisation may be such as to unload gears providing the first gear ratio thereby permitting the releasable coupling to disengage under the loading.

The gearbox may comprise releasable couplings between each intermediate shaft and the second shaft.

The or each releasable coupling may be a dog clutch.

The first shaft may be the output shaft. The second shaft may be the input shaft. Alternatively the roles of the shafts could be reversed.

BRIEF DESCRIPTION OF THE FIGURES

The present invention will now be described by way of example with reference to the accompanying drawings. In the drawings.

DETAILED DESCRIPTION OF VARIOUS EMBODIMENTS

Figure 1:
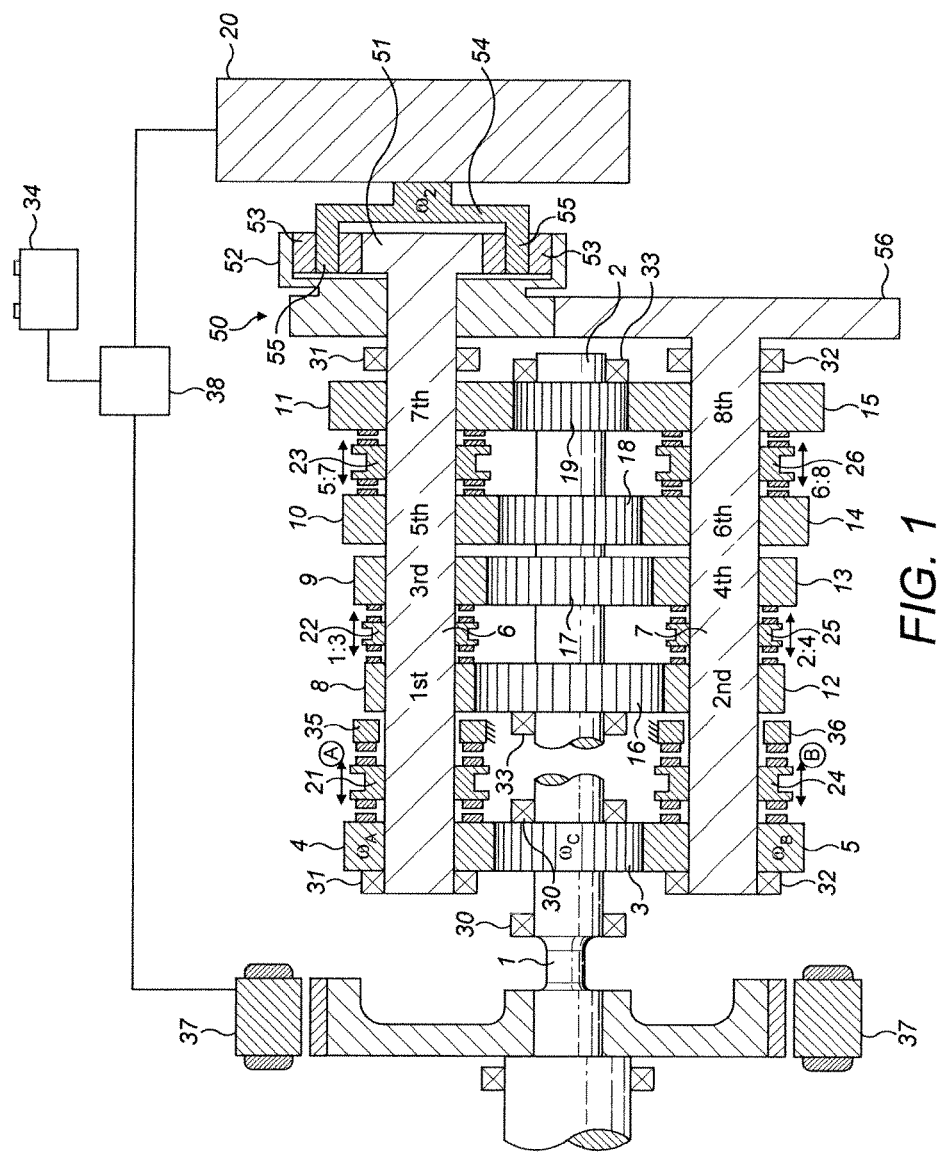
FIG. 1 is a schematic diagram of one example of a gearbox.

The gearbox of FIG. 1 couples an input shaft 1 to an output shaft 2. The input shaft can be coupled to a rotational drive, for example the crankshaft of an internal combustion engine (ICE) or the rotor of an electric motor. The output shaft could, for example, be coupled to the drive wheels of a vehicle, to the propeller of a boat or to a component of a fixed machine that consumes rotational drive. The input shaft carries a splitter gear 3. The splitter gear meshes with intermediate gears 4, 5 on respective intermediate shafts 6, 7. Each intermediate gear encircles its intermediate shaft. A dog clutch 21, 24 is associated with each intermediate gear. When an intermediate gear is disengaged from its dog clutch the intermediate gear is free to rotate about its intermediate shaft. When the intermediate gear is engaged with its dog clutch the intermediate gear is locked to rotate with its intermediate shaft. In this way, when one or both of the intermediate gears is locked to its intermediate shaft by its dog clutch the input shaft can drive one or both of the intermediate shafts to rotate.

The intermediate shafts carry a series of drive gears. Drive gears 8, 9, 10 and 11, which correspond respectively to first, third, fifth and seventh gear ratios of the gearbox, are carried by shaft 6 (the odd intermediate shaft). Drive gears 12, 13, 14 and 15, which correspond respectively to second, fourth, sixth and eighth gear ratios of the gearbox, are carried by shaft 7 (the even intermediate shaft). Each drive gear encircles its intermediate shaft. A dog clutch (22, 23, 25, 26) is associated with each drive gear. When a drive gear is disengaged from its dog clutch the drive gear is free to rotate about its intermediate shaft. When the drive gear is engaged with its dog clutch the drive gear is locked to rotate with its intermediate shaft. Each drive gear meshes with a slave gear (16, 17, 18, 19) which is rotationally fast with the output shaft. Hence, when one of the drive gears is locked to its intermediate shaft by its dog clutch that intermediate shaft can drive the output shaft to rotate.

A planetary or epicyclic gear arrangement shown generally at 50 is configured in such a way that it also couples the two intermediate shafts together. A sun wheel 51 of the planetary gear arrangement is attached to the odd intermediate shaft 6. The sun wheel 51 could be connected to either intermediate shaft. An outer ring gear 52 of the planetary gear arrangement meshes with a gear 56 which is attached to the other intermediate shaft, in this example the even intermediate shaft 7. The sun wheel 51 and the outer ring gear 52 are linked by planet wheels 53 meshing between the sun wheel and the outer ring. The planet wheels are carried by a rigid cage 54 (the planet carrier) which has spindles 55 about which the planet wheels rotate.

An electric "shift" motor 20 is coupled to the rigid cage 54 so that: (i) acting as a motor it can drive the cage to rotate, and (ii) it can be driven by rotation of the cage to act as a generator. This allows a range of operational modes, including those summarised below, in which it is assumed that an internal combustion engine is coupled to the input shaft 1 and that an electric motor is coupled to the planet cage 54. The two intermediate shafts are interchangeable.

1 a. Input-only drive mode. If intermediate gear 4 is locked to its intermediate shaft 6, a single drive gear is locked on intermediate shaft 6, and shaft 7 does not couple the input and output shafts, then the output shaft 2 can be driven by the ICE attached to the input shaft 1. In this mode it is convenient for both intermediate shafts to be driven simultaneously from the input shaft, since that allows changes of gear to be made readily. However, it is only necessary that the intermediate shaft through which the drive is being taken is driven. The other intermediate shaft could be free.

1 b. Input drive with shift motor mode. If (as described above) only the intermediate shaft through which the drive is being taken is driven, and the shift motor is active to drive or recover energy from the output shaft 2, then the shift motor can add or reduce torque to the output shaft in addition to that coming from the ICE in mode 1 a. In this mode 1b, the shift motor either adds energy to or absorbs energy from the drivetrain, depending on the relative direction of rotation of the planet carrier and the direction of torque transmission between the intermediate shafts. To achieve this the shift motor can apply torque to the driven intermediate shaft by acting against the other intermediate shaft, which can be restrained in the ways described below. The electrical energy generated or used by the shift motor in this mode could be stored in a battery 34 or used in other ways as will be described below.

2a. Shift motor-only drive mode. If both intermediate gears are unlocked from their intermediate shafts and a single drive gear is locked on each intermediate shaft then the intermediate shafts will rotate together. In this state, if the shift motor 20 is caused to drive the planet cage 54 to rotate this will generate a torque between the sun wheel 51 and the ring gear 52, which will cause the intermediate shafts and hence the output shaft to rotate. In this way the output shaft is being driven by the shift motor 20. Similarly, if the output shaft is driven with the gearbox in this configuration, for example when a vehicle attached to the gearbox is coasting to a halt, then the shift motor will be driven and can recover energy from the output shaft by acting as a generator. In this way the shift motor can provide regenerative braking. The drive ratio from the shift motor to the output shaft can be selected by engaging a desired pairing of drive gears on the respective intermediate shafts. Any combination of one odd (8/9/10/11) and one even (12/13/14/15) drive gear may be locked. However, the greater the difference between the drive gears selected the higher the torque available at the output shaft 3. Split-path continuously variable transmission (CVT) mode. One of the intermediate gears is locked to its intermediate shaft so that it can be driven by the ICE attached to input shaft 1. All the gears on that intermediate shaft are disengaged. The other of the intermediate gears is unlocked and one of the drive gears on the intermediate shaft of that other intermediate gear is locked to couple that intermediate shaft to the output shaft. In this state, the ICE is coupled to the output shaft through the planetary gear arrangement. The gearing ratio between the ICE and the output shaft is dependent on the rotational speed of the planet cage 54 and the drive gear that is engaged on the final intermediate shaft. If the output shaft were to be fixed then the planet cage would rotate in a certain direction under the drive of the ICE. If the motor drives the planet cage in the direction opposite to that certain direction it will increase the gearing ratio between the ICE and the output shaft. If the motor drives the planet cage in that certain direction it will reduce the gearing ratio between the ICE and the output shaft. If the motor drives the planet cage in that certain direction faster than the planet cage would rotate if the output shaft were fixed then the output shaft will be driven in reverse. In this way the shift motor allows a continuously variable selection of gearing ratios between the input shaft and the output shaft.

In this mode 3, the shift motor will either be adding or absorbing energy from the drivetrain, depending on the relative direction of rotation of the planet carrier and the direction of torque transmission between the intermediate shafts. For a given output shaft speed and torque, increasing the speed or torque of the ICE will tend to increase the rate of energy absorption (or reduce the rate of energy addition) by the shift motor. The electrical energy generated or used by the shift motor in this mode could be stored in the battery 34 or used in other ways as will be described below.

To shift gear quickly it may be desirable to quickly increase or reduce the rotational speed of the planet carrier 54. To allow the speed of the planet carrier to be quickly reduced the planet carrier or the shift motor 20 can be provided with a brake. The brake could be actuated during a shift and subsequently released. To allow the speed of the planet carrier to be quickly increased a clutch can be provided between the motor and the planet carrier. During or prior to a shift the clutch could be disengaged, and electrical energy applied to the motor to increase its speed. Then during a shift the clutch could be reengaged, thereby transferring kinetic energy from the motor to the planet carrier and quickly increasing the speed of the planet carrier.

As indicated above, some shift operations involve the motor adding energy to the drivetrain, and some shift operations involve the motor absorbing energy from the drivetrain. Other mechanisms than a motor could be used to achieve these functions. For example, the motor could be replaced by or augmented with a flywheel that can be selectively coupled to the planet carrier 54 by a clutch in order to—when the flywheel is rotating relatively quickly—add energy to the drivetrain. Similarly, the flywheel could be coupled via the same clutch to—when the flywheel is rotating relatively slowly—remove energy from the drivetrain. In another example the motor could be replaced by or augmented with a brake that can be selectively applied to brake the planet carrier 54 in order to absorb energy from the drivetrain. If the motor is replaced by a brake, and so energy can only be removed from the drivetrain at that point, the system is still capable of performing a subset of shifts in the manner disclosed above.

When the role of adding energy to and/or absorbing energy from the planet carrier can effectively be taken by means other than the motor, a smaller motor could be used in place of the shift motor shown in the figures. That smaller motor might be insufficient for performing substantially a full range of motor-assisted shifts. The motor may be of sufficient size to be used to start an internal combustion engine through the gearbox and/or may be capable of acting as an alternator when driven by an internal combustion engine through the gearbox. It may also assist with shifts that require relatively low amounts of energy transfer to or from the motor.

These modes and others to be described below are summarised in the table at the end of the present description. In that table either intermediate shaft can be selected as shaft A, with the other being shaft B.

The mechanical configuration of the gearbox will now be described in more detail.

Drive shaft 1 is borne by bearings 30. Intermediate shaft 6 is borne by bearings 31. Intermediate shaft 7 is borne by bearings 32. Output shaft 2 is borne by bearings 33. The bearings are fixed to the body of the gearbox (not shown). The intermediate shafts could be formed of separate pieces, or could be parts of a single piece of material, e.g. metal. If the shafts are formed of separate pieces they could be coaxial and joined rigidly together, e.g. by a splined connection. Alternatively, the pieces of a single input shaft could be non-coaxial but joined together so that they are required to rotate together, for example by a geared connection or a drive belt. The input shaft could be an extension of the crankshaft of an internal combustion engine, or the rotor of an electric motor, or could be driven through gears, a belt or by some other means. The output shaft could carry the final drive pinion gear of a vehicle (not shown) or an extension of the output shaft could provide rotational drive in some other way. Drive could be taken from one of the slave gears 16-19.

The mechanisms for selectively coupling each of the intermediate and drive gears to the input shafts could be dog clutches, as indicated above. Alternatively, other types of mechanism could be used: for example synchromesh devices or friction clutches. In one convenient arrangement, dog clutch units are shared between pairs of adjacent drive gears. In the example of FIG. 1 dog clutch 22 serves drive gears 8 and 9, dog clutch 23 serves drive gears 10 and 11, dog clutch 25 serves drive gears 12 and 13 and dog clutch 26 serves drive gears 14 and 15. In each case, the dog ring of the clutch can slide along its intermediate shaft. At one end of its travel it locks one of its drive gears to the shaft whilst the other is free. At the other end of its travel it locks that other one of its drive gears to the shaft whilst the first one is free. In the middle of the clutch's travel it is free from both its drive gears and neither of them is locked to the shaft. For example, when the dog ring of clutch 22 is to the left in FIG. 1 it engages drive gear 8 and locks that gear with intermediate shaft 6 whilst drive gear 9 is free to rotate with respect to intermediate shaft 6. Sharing clutches between drive gears in this way reduces the size and weight of the gearbox. The clutches could be controlled by any suitable shift control arrangement (e.g. electrical, hydraulic, or mechanical). Conveniently, they can be moved by actuators (not shown) under the control of a control unit 38.

The mechanisms for selectively coupling each of the intermediate and drive gears to the input shafts could be capable of driving the respective gear in only a single direction. This can make it easier to disengage the respective mechanism once another gear has been selected. One example of such a mechanism is a dog clutch in which the teeth of at least one side of the clutch are chamfered on one of their faces so that when relative motion of the opposite sides of the clutch is in one sense the teeth of the respective sides can override each other side without driving, whereas when relative motion of the sides of the clutch is in the other sense the teeth drivingly engage each other. Other one-way drive mechanisms such as limited sprag clutches could be used for the drive mechanisms.

Preferably any one or more of the drive mechanisms can be selectively placed in any of the following three modes:
1. an engaged mode in which drive can be transmitted in both directions;
2. a one-way mode in which drive can be transmitted in only a single direction;
3. a disengaged mode in which drive cannot be transmitted in either direction.

By providing an engaged mode in addition to a one-way mode positive coupling of the drivetrain can be maintained even when there is backlash in the output train. As an example, a drive mechanism of this type can be provided by enabling the drive mechanism of a dog clutch to rest in three positions, one corresponding to each mode. The dog teeth are of normal form except at their tips, where a single face of each tooth on at least one side of the clutch is chamfered. In the engaged mode the mechanism is positioned so that the teeth are fully engaged. In the disengaged mode the mechanism is positioned so that the teeth are fully disengaged. In the one-way mode the mechanism is at an intermediate position in which the teeth are partially engaged, so that the chamfered parts can ride over the teeth of the other side of the clutch when the drive is in one direction, but drive is provided in the other direction. The clutch could be positioned by a hydraulic piston acting on one end of a lever, the other end of the lever being forked to cup a side of the clutch. When the clutch is in its intermediate position the piston could exert a light force on the clutch to restore the teeth to partial engagement when they ride over each other. Alternatively, that function could be fulfilled by a spring that biases the teeth towards each other.

The drive gears could be arranged in any convenient order on the intermediate shafts. The drive gears for odd and even gears could be segregated, as in the gearbox of FIG. 1, or distributed between the input shafts. Each drive gear could have its own slave gear on the output shaft or, as shown in FIG. 1, one or more of the slave gears could mesh with drive gears on both of the input shafts. Naturally, this requires the order of the drive gears and the spacing between the intermediate shafts and the output shaft to be selected accordingly. The axes of the intermediate shafts and the output shaft may be substantially parallel to each other. The intermediate shafts and the output shaft could lie in a common plane or not.

In one convenient configuration, the pitch circle diameters (PCDs) of intermediate gears 4 and 5 are different from each other, so the drive ratios from input shaft 1 to intermediate shafts 6, 7 are different. Then some or all of the drive gears on one intermediate shaft can have the same PCD as the drive gears on the other intermediate shaft and still generate different gear ratios if they mesh with the same slave gear. In the example of FIG. 1, the PCD of intermediate gear 4 is different from the PCD of intermediate gear 5 but the PCDs of drive gears 8 and 12 are the same, as are the PCDs of drive gear pairings 9 and 13, 10 and 14 and 11 and 15. This is advantageous in that it allows for re-use of components.

When the drive gear pairs that provide adjacent gearing ratios (first and second, third and fourth etc.) are on opposite intermediate shafts and both engage a common slave gear, the PCDs of the slave gears can be selected to provide convenient scaling of gearing ratios through the gearbox. For instance, if the ratio between the PCDs of the intermediate gears 4, 5 is X then the step between each gearing ratio can conveniently be made to be approximately X by making the ratio between the PCDs of successive slave gears $X^2$. When this arrangement is adopted the drive gear pairs that engage a common slave gear can conveniently be of the same PCD, with the result that the intermediate shafts are equally spaced from the output shaft. This avoids potential difficulties in selecting the numbers of teeth of the gears so that each drive gear properly engages its slave gear and all gears have an integer number of teeth.

With X defined as above, the intermediate shafts are synchronised (that is, their intermediate gear dog clutches 21, 24 may be simultaneously engaged) when the rotational speeds of the intermediate shafts A and B ($\omega_A$ and $\omega_B$) obey equation (1):

$$\omega_B = X \cdot \omega_A \qquad (1)$$

When the intermediate shafts are synchronised, it is preferred that the ratios of the planetary gear set are such that the planet cage is stationary, or near stationary. This arrangement allows the power consumption of the shift motor to be kept low when the shafts are synchronised, even if the shift motor is producing a high torque. This is advantageous during gearshifts which require synchronisation of the shafts using the shift motor. This synchronisation may be required regardless of which intermediate shaft is rotating faster (e.g. A may be faster than B or vice versa).

Additional operating modes can be provided if either of the intermediate shafts can be locked in position. This can be achieved by any suitable mechanism, but one route is to provide a dog clutch on each intermediate shaft that can lock it to ground, i.e. to the casing of the gearbox. That dog clutch could be dedicated to grounding the respective intermediate shaft, or it could also be capable of locking the intermediate shaft's intermediate gear to the shaft. In the gearbox of FIG. 1, dog clutch 21 can either lock intermediate shaft 6 to intermediate gear 4 or to grounding block 35. Dog clutch 24 can either lock intermediate shaft 7 to intermediate gear 5 or to grounding block 36. Each grounding block is fast with the casing of the gearbox.

This allows the following operating mode:

2b. Grounded shift motor-only drive mode. As in mode 2a, both intermediate gears are unlocked from their intermediate shafts. A single drive gear is locked on one of the intermediate shafts; that intermediate shaft is not locked to ground. All intermediate gears are unlocked on the other intermediate shaft and that other intermediate shaft is locked to ground. In this state, when the shift motor 20 drives the planet cage 54 to rotate, the reaction against the grounded intermediate shaft will cause the other intermediate shaft to rotate. Similarly, if the output shaft is driven with the gearbox in this configuration then the shift motor 20 will be driven and can recover energy from the output shaft by acting as a generator.

Additional operating modes can be provided if a second "input" motor is provided in such a way that its rotor is coupled to the input shaft 1. The input motor could have the input shaft as its rotor, as in FIG. 1 where the input motor is shown at 37. In this example a flywheel of the drivetrain acts as the rotor of the input motor, and the stator of the motor is arranged around the flywheel. Alternatively the input motor can be coupled to the input shaft by a gear mechanism independent of the gearbox itself. The input motor is preferably coupled to the input shaft so that it will always rotate with the input shaft, but it could be capable of being engaged, e.g. by a clutch mechanism.

If such an input motor is used, it may be advantageous to allow the input rotational drive (the ICE in the example above) to be decoupled from the gearbox on the driven side of the input motor, e.g. by a clutch mechanism (not shown in FIG. 1).

If an input motor is used, then in modes 1a, 1b or 3 the input motor alone could drive the input shaft. Alternatively both the ICE and the input motor could drive the input shaft (with the input motor adding or removing torque from the ICE drive). When the input motor (whether alone or together with the ICE) is driving the input shaft along with the shift motor (e.g. in modes 1 b, or 3) the power requirement for the output shaft can be shared between the motors by appropriate choice of their speeds and torques. The power consumed by each motor can be expected to be equal to the torque being transmitted by that motor multiplied by the speed of the motor. Thus it is possible to share between the motors the motor speeds and torques required to achieve a certain output shaft speed and torque. In that way the motor power limits of each motor can be met for a higher output shaft power than in other modes. The motors could both be in driving mode, or the motors could both be in generating mode, or one could be in driving mode and one could be in generating mode.

The input motor could be coupled to a charge storage device such as battery 34 to which it can store power when it is recovering energy from the input shaft and from which it can derive energy to drive the input shaft. In a preferred arrangement the input motor and the shift motor are coupled so that they can share charge. One way to achieve this is to connect them across the same battery. More practically, they could be connected via a controller 38 to a common battery 34. The controller allows the amount of charge flowing to or from the battery and each of the motors 20, 37 to be controlled independently. When both motors are connected to a common charge store or power bus the machine can also operate in further modes.

4a. Series hybrid mode. The gearbox is configured as for mode 2a. This has the result that the input shaft is uncoupled from the intermediate shafts. In this configuration the ICE drives the input shaft and the input motor acts as a generator, recovering from the input shaft the energy provided by the ICE. The charge generated by the input motor is use to drive the shift motor, which powers the output shaft as described with reference to mode 2a above. If the input motor is generating more energy than the shift motor is consuming then the charge controller 38 can cause the excess to be stored in the battery 34. If the input motor is generating less energy than the shift motor is consuming then the shift motor can draw stored energy from the battery 34.

4b. Grounded series hybrid mode. This mode is analogous to mode 2b in the same manner that mode 4a is analogous to mode 2a.

Additionally, when both motors are connected to a common charge store or power bus then this brings a particular advantage to mode 3, where the energy being consumed or generated by the shift motor can be partly or wholly taken from, or sent to the input motor. This could reduce the size of the external battery required for a given shift motor power, or eliminate the need for an external battery altogether.

In a vehicle or other machine in which the gearbox of FIG. 1 might be installed it could be necessary to accelerate or decelerate the output drive or to modulate the power passed to or extracted from the output in response to certain operational events. For example, in the case of a vehicle it might be necessary for the vehicle to move away from stationary, accelerate, decelerate, change gear and so on. The use of the gearbox in such operational events will now be described. For ease of illustration the gearbox will be described in use in a motor car, with the output shaft coupled to the car's driven wheels, but the following operating strategies could be used in other machines.

When a car that is driven by an internal combustion engine pulls away from stationary there is normally a need to slip the car's clutch or torque converter because when the car is pulling off the engine speed cannot be matched to the road speed. This involves a loss of power in the clutch or torque converter. In a car driven by the gearbox of FIG. 1, there are several operational strategies that can address this problem.

The vehicle could pull away from stationary in any of modes 2a, 2b, 4a, or 4b with the ICE decoupled from the output. In these modes the output can be driven exclusively by the shift motor, removing the need for slippage between an ICE and the wheels. In modes 4a or 4b the ICE may operate, driving the input motor to provide the power required by the shift motor in accelerating the vehicle, and providing the driver with the familiar feedback of the ICE starting when the ignition is turned.

The vehicle could pull away from stationary in mode 3. In that mode it can be driven by both the ICE and the shift motor. (The ICE could optionally be supplemented by the input motor). In mode 3 the relationship between the speed of the input shaft, and therefore the ICE, and the output shaft is dependent on the speed at which the shift motor causes the planet cage to rotate, whilst the torque being transmitted from the input shaft to the output shaft is defined by the torque at the shift motor. Before the vehicle pulls away, with the ICE running the shift motor could be allowed to freely rotate without applying a torque, such that the output shaft naturally remains stationary. Then when the vehicle is to pull away the shift motor could progressively impose a torque, driving the speed of the output shaft to increase from zero. In doing so the shift motor would generate electrical energy which could be stored in the battery or recycled to the input motor to assist the ICE. As the car accelerates the power output of the ICE could be maintained constant, increased or reduced. Assuming sufficient power and road-holding the acceleration of the car will be dependent on the torque applied by the shift motor. That torque could be selected by the controller 38 in dependence on driver inputs.

This arrangement has the advantage that energy losses in the shift motor are much lower than energy losses in the clutches or torque converters used on conventional gearbox designs. Hence the ICE can operate in an efficient and/or powerful speed range during pull-away, even from stationary, without excessive efficiency penalty or heat rejection from the transmission. As indicated previously, the ICE could be supplemented by the input motor, which could consume electrical energy stored in the battery and/or electrical energy contemporaneously generated by the shift motor.

Similarly, when the gearbox is in mode 3 the car could be held stationary on a hill with the ICE and/or the input motor operational and the shift motor acting to hold the output shaft stationary against a torque imposed through the action of gravity on the car.

Another operational scenario is the need to spin the ICE in order to start it. This could be done by the input motor. If the vehicle is being driven in mode 2a, 2b, 4a, or 4b the input shaft is not coupled to the output shaft, so the engine can be started independently of the car's wheels and thus without disturbing the drivetrain.

When the car is being operated in one mode it may be desirable to switch to operating in another mode. A number of ways in which this may be done are noteworthy. The following list is not exhaustive. Other routes are possible for switching between modes. It will be apparent that some of those other routes could utilise the principles of synchronisation and unloading described below in order to achieve smooth transitions. The transitions will be designated A-I, corresponding to the reference letters in FIG. 2.

A. Mode 2b grounded shift motor-only drive or mode 4b grounded series hybrid mode to mode 3 split-path CVT. When the car is being driven in mode 2b or 4b with the ICE inactive, the intermediate gear on the intermediate shaft that is grounded can be engaged, the input motor can take up the reaction torque, and then that intermediate shaft can be released from ground (NB—this is not possible with the configuration shown in FIG. 1 in which the intermediate gear shares a dog clutch with the grounding block; separate dog clutches would need to be provided to implement route A.) This puts the gearbox in mode 3. At this point the input motor can rotate and fire the ICE, and once the ICE is running it can contribute to driving the vehicle as described above in relation to mode 3. During this operation there should be minimal torque disturbance to the output shaft, as this continues to be driven through the $2^{nd}$ intermediate shaft, with the torque defined by the shift motor.

B. Mode 4a or 4b Series hybrid mode, or mode 2a or 2b Shift-motor only drive to mode 1a Input-only drive. In both variants of mode 2 and both variants of mode 4 the car is being driven by the shift motor alone. It may be desired to engage the ICE to supplement or replace the shift motor. The ICE may already be running, or it could be started with the input motor or a dedicated starter motor. In modes 2a and 4a both intermediate shafts are able to rotate. In modes 2b and 4b one of the intermediate shafts ("shaft B") is grounded and the other shaft ("shaft A") is able to rotate. It does not matter which shaft is which. If it is desired to take drive from the ICE, the ICE can now be set to a speed at which it is harmonised with an intermediate shaft that is currently rotatable (that is either shaft in mode 2a or 4a, or shaft A in mode 2b or 4b). In the gearbox of FIG. 1, that involves setting the speed of the ICE such that it is driving the intermediate gear 4, 5 of the appropriate shaft at the same speed as that shaft. The appropriate dog clutch 21, 24 can then be operated to lock that intermediate gear to its intermediate shaft. Since the newly-engaged intermediate gear and its intermediate shaft were already rotating at the same speed, the engagement of the dog clutch does not disrupt the car's drivetrain. Depending on the type of dog clutch that is in use, before engaging the clutch it may be desirable to either adjust the position of the intermediate gear with respect to its shaft (for example in response to position sensors on the various components of the gearbox), or leave a small speed difference between this gear and its dog ring in order that the clutch engages cleanly. Once the intermediate gear has been engaged, the drive torque can be transferred from the shift motor to the ICE with the result that the ICE is driving the output. If the previous transition was from mode 2a or 4a all drive gears on the disengaged intermediate shaft can be disengaged. If the previous transition was from mode 2b or 4b, the grounded shaft can be ungrounded. Then the intermediate shafts can be synchronised and both intermediate gears can be engaged to put the car in mode 1 a. Alternatively, it may now be desired to move to mode 3, which can be achieved using route G below. Moving from mode 2b or 4b to mode 3 by this route (route B followed by route G) places less load on the input motor than in route A above.

C. Mode 2a shift motor only drive or mode 4a series hybrid mode to mode 3 split path CVT. Similarly to route B above, the ICE may already be running, or it could be started with the input motor or a dedicated starter motor. It should then be synchronised to a speed which is harmonised with an intermediate shaft (shaft B for this example, but it could be either) before shaft B's intermediate gear is engaged. At this point the input motor and ICE should then apply the correct torque to unload the drive gear on shaft B (with the torque at the shift motor being adjusted appropriately to maintain output torque). Once the drive gear on shaft B is unloaded that gear can be disengaged freely. The gearbox is now in mode 3.

D. Mode 3 Split-path CVT to mode 2b or 4b. The car may be in mode 3, and it may be desired to switch to drive to only the shift motor, with 1 shaft grounded. To achieve this, the speed of the ICE can be reduced, as the speed of the shift motor is increased to compensate. The ICE can be stopped by means of the input motor, which will continue to react the torque from the shift motor to enable drive to be maintained to the output shaft. Once the ICE is stopped the intermediate shaft to which it is connected (shaft B in the table) can be locked to ground and the intermediate gear on that shaft can be unlocked to de-couple the ICE from the shaft.

E. Mode 3 Split-path CVT to mode 2a or 4a. If it is desired to perform a similar transition to route D above, but leave the shafts ungrounded, then the speed of the ICE can be adjusted such that a drive gear on the intermediate shaft with no drive gears engaged (shaft B in the table) is synchronised (i.e. shaft B is rotating at a speed relative to the output shaft such that there is no speed difference between the drive gear and shaft B which it encircles such that its dog ring may be engaged freely). This synchronised drive gear may then be engaged. The torque on the gearbox input may then be reduced, either by reducing torque from the ICE or by increasing the torque removed by the input motor. This reduction may be compensated by an increase in torque from the shift motor. Once the torque on the input has reduced to zero the intermediate gear which is engaged (the intermediate gear on shaft B in the table) may be disengaged. The gearbox is now in mode 4a. If mode 2a is desired then the input motor and ICE may be brought to rest.

F. Mode 3 Split-path CVT to mode 1a Input-only drive. To perform this transition the speed of the ICE should be adjusted such that it is synchronised with the shaft which has the engaged drive gear (shaft A in the table). At this point the intermediate gear of shaft A can be engaged, and torque removed from the shift motor, leaving the gearbox in mode 1 a.

G. Mode 1a Input-only drive to mode 3 Split-path CVT. In order to move from mode 1 a to mode 3 the intermediate gear on the shaft which has the engaged drive gear (shaft A in the table) must be unlocked from its shaft. Before doing this it is desirable to unload that gear by taking up torque (via the other shaft—shaft B) using the shift motor. The intermediate gear can then be unlocked without straining the gear or its clutch and without disrupting the car's drivetrain.

H. Mode 1a input-only drive to mode 2b Grounded shift motor-only drive or mode 4b Grounded series hybrid mode. The ICE is driving the output shaft through intermediate shaft A. There is essentially no load on intermediate shaft B. Accordingly, the intermediate gear of intermediate shaft B can readily be unlocked. Then the shift motor can be used, reacting against shaft A, to bring intermediate shaft B to a stop. Then intermediate shaft B can be locked to ground. The shift motor can then take up the drive torque, and the ICE can be operated to unload the intermediate gear on shaft A, as described above, with drive being taken up by the shift motor. Then the intermediate gear on shaft A can be unlocked. If desired, the ICE can be stopped.

I. Mode 1a Input-only drive to mode 2a Shift motor-only drive or mode 4a Series hybrid mode. The ICE is driving the output shaft through intermediate shaft A. There is essentially no load on intermediate shaft B. Accordingly, the intermediate gear of intermediate shaft B can readily be unlocked. Then the shift motor can be used, reacting against shaft A, to bring intermediate shaft B to the appropriate speed for engaging a desired drive gear on shaft B. Then that drive gear can be engaged. The shift motor can then take up the drive torque, and the ICE can be operated to unload the intermediate gear on shaft A, as described above. Then the intermediate gear on shaft A can be unlocked. If desired, the ICE can be stopped.

Figure 2:
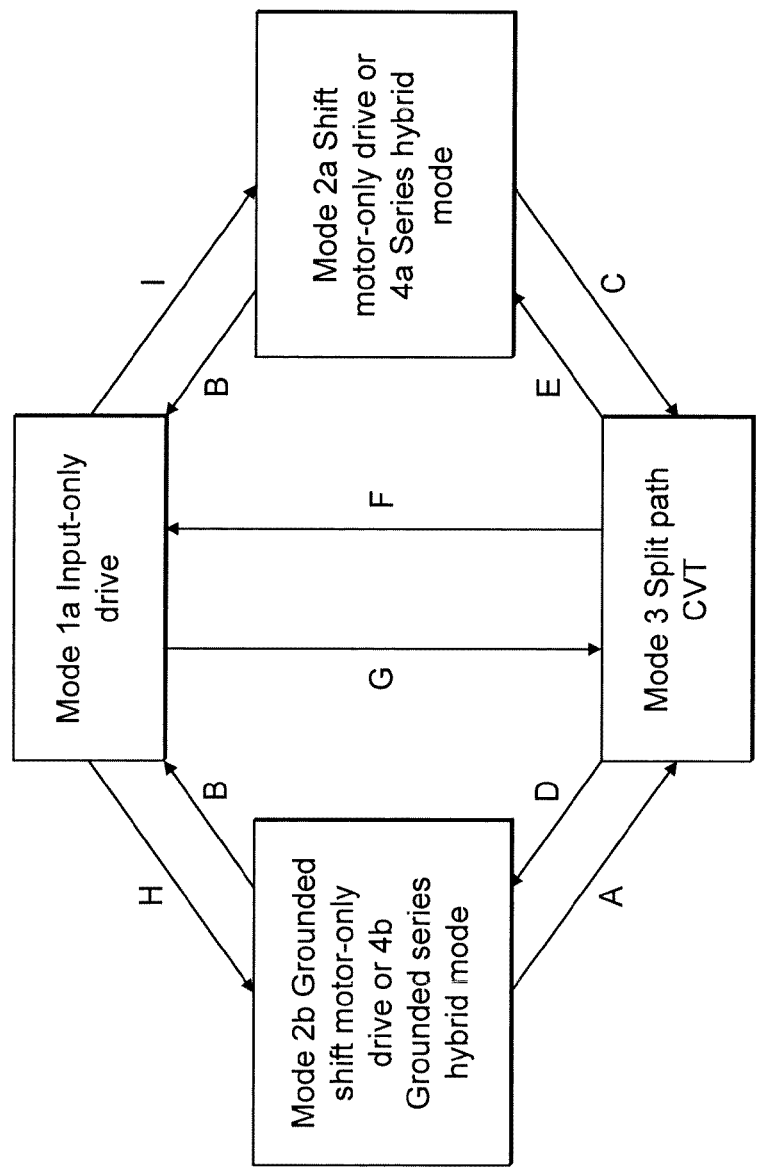
FIG. 2 is a chart showing example mode transitions

As illustrated in FIG. 2, a number of techniques can be desirable in designing a programme for transitioning from one operating mode to another.

a. When an intermediate gear is to be engaged, synchronising the speed of that gear with its intermediate shaft. This can conveniently be done using a drive source that is not currently driving the output shaft, typically the shift motor.

b. When an intermediate gear is to be disengaged, relieving load from that gear. This can conveniently be done by operating the ICE and/or the input motor in concert with the shift motor so that the output is being driven exclusively by the drive source that is to take up the driving of the output shaft after the intermediate gear has been disengaged, with the other drive source(s) causing the intermediate gear to be driven under no load at the corresponding speed. Typically, drive will be taken up by the shift motor and the ICE and/or the input motor will be operated to run the intermediate gear at the same speed as the shift motor is causing the intermediate shaft to run.

c. When an intermediate shaft is to be locked to ground or to have a drive gear engaged on it whilst the output shaft is rotating, to use the shift motor to bring the intermediate shaft to the appropriate speed: i.e. to a halt or to a speed that will allow the drive gear to be freely engaged.

d. When an intermediate shaft is to be unlocked from ground or to have a drive gear disengaged on it whilst the output shaft is rotating, to use the shift motor to relieve torque on the intermediate shaft, or to use the input motor to relieve torque on the grounding clutch, so that the appropriate clutch can be freely disengaged.

Similar principles can be employed whilst the gearbox remains in mode 1a in order to reduce what would normally be a reduction in torque during a gearshift. With the gearbox operating in mode 1a as described in the table below, the gearbox may need to perform an upshift. For illustration, suppose a gear is currently engaged through intermediate shaft A. With the gears arranged sequentially on alternate shafts the next gear would be on intermediate shaft B. The gearbox can perform the following steps to execute the upshift.

i. Unlock the intermediate gear on intermediate shaft B. This gear may be unlocked as part of the upshift process or it could have been unlocked at the end of a previous shift process when shaft B was released from driving.

ii. The shift motor is used, reacting against shaft A, to cause shaft B to rotate relative to the output shaft at a speed that will allow the new drive gear to be smoothly engaged. Ideally, that speed is the one that causes shaft B to rotate at the same speed as that drive gear.

iii. The appropriate clutch is operated to engage the new drive gear.

iv. The drive torque is taken up by the shift motor so that the drive gear on shaft B is loaded and the drive gear on shaft A is unloaded.

v. The drive gear that was in use on shaft A prior to the shift is disengaged.

vi. The input shaft is set to a speed that will allow the intermediate gear on shaft B to be smoothly reengaged. Ideally that speed is one at which the intermediate gear on shaft B is rotating at the same speed as shaft B. In the case of an upshift this will require the speed of the input shaft to be reduced. This can be done by one or more of: reducing the power generated by the ICE, slowing the ICE using the input motor or by operating the shift motor to react against shaft A, driving shaft B and causing shaft A and hence the ICE to decelerate. If the shift motor is equipped with a brake the brake can be applied to slow the shift motor. As a result of one or more of these measures the shift motor will now be operating at zero or close to zero speed.

vii. The intermediate gear on shaft B is locked to shaft B.

viii. Drive is taken up by the ICE, unloading the shift motor.

Alternatively, the gearbox can perform the following steps to execute the upshift.

i. The shift motor reacts against intermediate shaft B to take up the torque that was being transmitted through intermediate shaft A. This unloads the intermediate gear on intermediate shaft A.

ii. The intermediate gear on shaft A is unlocked.

iii. The input shaft is set to a speed that will allow the new drive gear on shaft B to be smoothly engaged. Ideally that speed is one at which that drive gear is rotating at the same speed as shaft B. In the case of an upshift this will require the speed of the input shaft to be reduced. This can be done by one or more of: reducing the power generated by the ICE, slowing the ICE using the input motor or by operating the shift motor to react against shaft A, causing shaft B and hence the ICE to decelerate. If the shift motor is equipped with a flywheel that can be engaged by means of a clutch, then if the flywheel was already rotating at a speed sufficient to accelerate the shift motor the clutch can be engaged to increase the speed of the motor. As a result of one or more of these measures the shift motor will now be operating at a relatively high speed.

iv. The new drive gear is engaged on shaft B.

v. The shift motor is unloaded, causing torque from the input shaft to be borne by intermediate shaft B and unloading the drive gear on intermediate shaft A.

vi. The drive gear previously engaged on shaft A is disengaged.

vii. Shaft A may then be slowed by the shift motor to a speed at which its intermediate gear can be re-engaged viii. The intermediate gear on intermediate shaft A can be re-engaged.

Both of these routes allow power transmission to be maintained throughout the gearshift. Because the shift motor only needs to provide torque to cover the difference in speed between the intermediate shafts the power provided by the shift motor can be relatively small compared to the power of the ICE whilst still providing continuity of power to the output shaft during the gear shift. This allows the system to be smaller and lighter than comparable designs that implement continuous torque upshifts. Furthermore, in the protocols described above the gears are engaged and disengaged when their speeds are matched to those of their shafts. This avoids the need for friction clutches or synchromeshes, allowing simpler dog clutches to be used, which give direct drive, and reduces the force needed to engage the gears.

Analogous protocols can be used to provide continuous torque downshifts.

Either protocol can be begun at step i when a need to implement a shift is detected. That need can be detected either from a shift command from the driver or from an automatic shift controller. Alternatively, in the case of the first protocol, some of the steps may be performed in anticipation of a gear change. That may be triggered either by the driver actuating a control, e.g. partially pulling a shift paddle, or by the car detecting that driving conditions are such that an upshift can be anticipated, e.g. the ICE accelerating under load towards its highest permissible speed. When a shift is anticipated in that way steps i to iii can be performed and then when a shift is commanded steps iv onward can be performed. That can reduce the time needed to execute a shift once commanded.

By implementing two such procedures back-to-back the gearbox can shift smoothly between two gears on the same input shaft: for example from second to fourth gear.

Maintaining torque during a gearshift is also possible when starting in mode 3. For example suppose a drive gear is currently engaged through intermediate shaft A, and the gearbox is operating in mode 3 with the intermediate gear on shaft A disengaged, and the intermediate gear on shaft B engaged.

i. The input speed of the gearbox is adjusted such that an appropriate drive gear on shaft B can be engaged.

ii. The new drive gear on shaft B is engaged, iii. The drive torque is removed from the shift motor, loading the new drive gear on shaft B, and unloading the drive gear on shaft A.

iv. The old drive gear on shaft A is disengaged.

v. The shift motor adjusts the speed of shaft A such that its intermediate gear can be engaged.

vi. The intermediate gear on shaft A is engaged.

vii. The shift motor then reapplies torque, unloading the intermediate gear on shaft B.

viii. The intermediate gear on shaft B is disengaged.

The gearbox is now operating in mode 3, in a different gear on the opposite shaft.

When the gearbox is operating in any mode, conventional "break of drive" gear changes may be performed between gears using conventional methods, namely:

i. Remove drive torque from the gearbox input ii. Disengage old gear iii. Synchronise the driven shafts to the new gear speed iv. Engage new gear v. Re-apply drive torque In this sequence although drive is not maintained, the use of the shift motor is still advantageous compared to a traditional transmission as it can reduce the time taken to complete step iii. It also means that the shift can be achieved without synchromesh devices.

In some vehicles it is possible to temporarily boost power output by supplementing the output of the ICE with electrical drive. In a vehicle having the gearbox of FIG. 1 the power output could readily be boosted using the input motor taking power from the battery 34. Alternatively or in addition, the power could be boosted using the shift motor in one of two ways as follows.

Firstly by entering mode 3 Split-path CVT mode and using the shift motor to add speed (and hence power) to that from the ICE by driving torque across an increase in speed from the driven shaft—shaft B in the table—to the shaft on which the drive gear is engaged—shaft A in the table.

Secondly by entering mode 1b Input drive with shift motor, and using the shift motor to add torque (and hence power) to that from the ICE by driving the intermediate shafts against each other in such a way that adds a net torque to the output shaft.

The gearbox could have a reverse gear arrangement as in many conventional gearboxes. Alternatively, when the output shaft is to be driven in reverse, that could be done by the shift motor in modes 2a, 2b, 3, 4a or 4b, or by the input motor in modes 1a or 1b, if the ICE can be declutched.

The ICE could be coupled to the input shaft via a clutch, to allow use of the input motor without the ICE turning. Alternatively, such a clutch could be omitted, allowing space and weight to be saved. Then the crankshaft of the engine could be an extension of the input shaft, or could be connected in a slip-free manner to the input shaft, e.g. by one or more gears.

The gearbox could have any number of gears, which could be arranged in any way on the intermediate shafts. However, it is convenient for successively ranked gear ratios to be available through different intermediate shafts.

The input, output and intermediate shafts could be equipped with position sensors that allow their positions to be determined. The data from those sensors could be fed to the controller 38. The controller could control the operation of the gearbox in response to inputs received from an operator and from the position sensors. The driver could provide inputs such as power demand (e.g. from an accelerator pedal), retardation demand (e.g. from a brake pedal), gear selection (e.g. through a gearstick or shift paddle) and driving mode (e.g. through a selector switch). The position sensors could provide the rotational position and hence speed of the shafts. The controller could use these inputs to alter the power output of the ICE and the motors, the operating mode of the gearbox and any regenerative braking to be performed by the motors. The control unit could control the clutches of the gearbox by actuators, for example electrical or electro-hydraulic actuators.

Either or both of the input motor and the shift motor could be hydraulic motors instead of electrical motors. The hydraulic motors could draw hydraulic energy from and store hydraulic energy to one or more accumulators or, via an electrical pump/turbine, to a battery.

During high power shifts it may be desirable to permit slippage of the link between the shift motor and the intermediate shafts. This could be done by means of a clutch between the shift motor and the planetary gear arrangement. When the shift motor is absorbing energy, partly slipping this clutch would reduce the speed required of the shift motor. This could allow a less powerful motor to be used as the shift motor.

The same effect could be achieved by using an inter-shaft clutch as described below. If such a clutch were present, then when the shift motor was absorbing energy, partly engaging this clutch would reduce the torque required of the shift motor. This could allow a less powerful motor to be used as the shift motor.

The input motor and the shift motor could be of different sizes and ratings. Then the most appropriate motor can be used at any time.

When the power of the ICE is to be reduced, that could be done by restricting fuel to the ICE. Alternatively, or in addition, it could be done by changing other parameters of the ICE, for example cutting sparking, retarding or advancing ignition or restricting input air.

The ICE could be omitted, leaving the input motor and the shift motor. Similarly, the input motor could be omitted leaving the ICE and the shift motor.

The planetary gear arrangement 50 could be replaced by another mechanism that is capable of transferring torque synchronisation between the input shafts, for example a continuously variable transmission (CVT). Thus instead of planetary gear arrangement 50, gears 51 and 56 on the respective intermediate shafts could be interconnected by a CVT.

The transmission controller 38 could be pre-programmed to set the dog clutches and the power input to and/or drawn from the motor(s) and the ratio of any CVT to cause it to operate in the manner described above, in response to inputs from a driver and, if desired, information on the state of the gearbox such as the rotation speed of the various shafts. Alternatively, any or all operations of the gearbox could be implemented manually.

Figure 3:
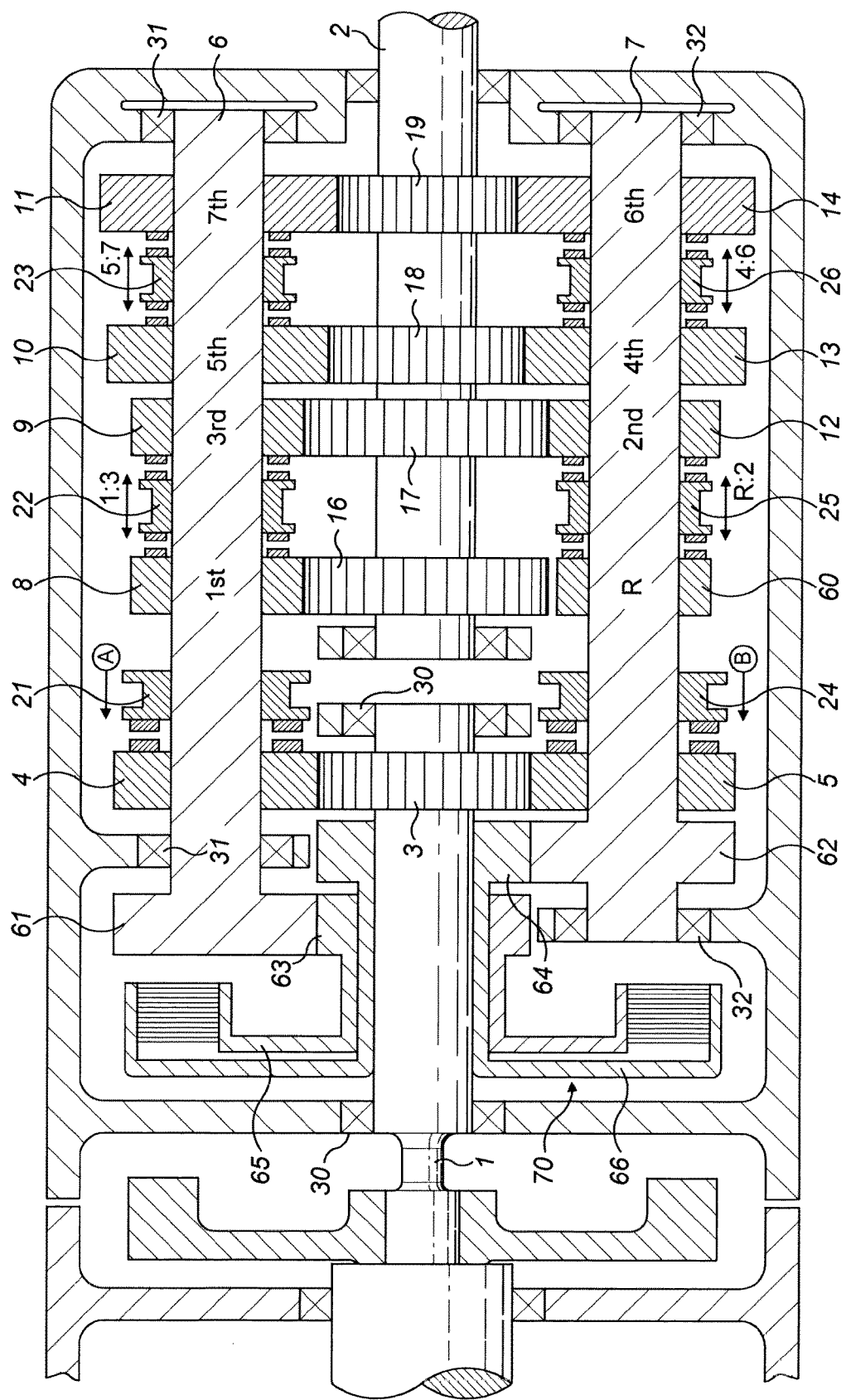
FIG. 3 is a schematic diagram of another example of a gearbox.

Instead of, or in addition to, a planetary gear arrangement, the two intermediate shafts could be linked by an inter-shaft clutch 70, as shown in FIG. 3. In FIG. 3 analogous elements are labelled as in FIG. 1. Drive gears 8, 9, 10, 11 provide first, third, fifth and seventh gears respectively. Drive gears 12, 13, 14 provide second, fourth and sixth gears respectively. In this gearbox reverse is provided in the conventional way through a reverse gear 60 which connects to output gear 16 via an idler (not shown). As in the gearbox of FIG. 1, intermediate gears 4, 5 can be selectively coupled to their respective intermediate shafts 6, 7 by clutches 21, 24. Clutch 70 provides a route whereby the intermediate shafts can be coupled together independently of any torque paths through gears 8-14 and the output shaft. Conveniently, as shown in FIG. 3, the clutch is packaged with the shafts running to it and/or being rotationally fast with its plates being concentric, one passing through the other. One of the input and output shafts may also be concentric with the shafts of the clutch. Preferably that one of the input and output shafts passes through the clutch shafts as shown in FIG. 3. In FIG. 3 it is the input shaft that passes through the clutch shafts, but if the clutch were at the other end of the gearbox it could be the output shaft that passes through the clutch shafts.

In the gearbox of FIG. 3, each input shaft also carries a clutch linking gear 61, 62. Each clutch linking gear meshes with a respective clutch gear 63, 64 which is attached to a respective one of the clutch plates 65, 66. In this way, clutch plate 65 rotates with intermediate shaft 6 and clutch plate 66 rotates with intermediate shaft 7.

The planetary gear arrangement of FIG. 1 is absent from the gearbox of FIG. 3.

The PCDs of gears 4 and 61 are conveniently the same as each other, as are those of gears 3, 64 and 65, and 5 and 62. Other gear ratios could be chosen.

The operation of the gearbox of FIG. 3 will now be described taking the example of the gearbox being installed in the drivetrain of a motor car. The gearbox could be used in other applications.

At rest, clutches 21-26 are all disengaged and the inter-shaft clutch 70 is open. An ICE or other drive source is attached to input shaft 1 and is driving the input shaft to rotate. The intermediate shafts are stationary. It is desired to pull off in first gear. Clutch 24 is operated to lock intermediate gear 5 to intermediate shaft 7. Intermediate shaft 7, clutch linking gear 62 and clutch plate 66 are rotated by the input shaft. Drive gear 8, which provides first gear, is engaged by being locked to intermediate shaft 6 by clutch 22. The inter-shaft clutch is then progressively closed to link the intermediate shafts together. This causes torque to be transmitted through drive gear 8 to the output shaft 2, accelerating the output shaft until there is no slippage of the inter-shaft clutch. The choice of ratios of gears 3, 4, 5, 61, 62, 63 and 64 means that at this point intermediate gear 4 is rotating at the same speed as intermediate shaft 6. Clutch 21 can therefore be readily closed, locking the input shaft 1 to intermediate shaft 6 through a route independent of the inter-shaft clutch 70. At that point the inter-shaft clutch can be opened. An analogous procedure can be used to pull away in other gears, including reverse.

When the vehicle is being driven normally in first gear, the inter-shaft clutch is open, as are all of clutches 22, 23, 25, 26. Clutches 21 and 22 are closed so that drive can go through drive gear 8. Clutch 24 is closed so intermediate shaft 7 is being driven from splitter gear 3. When the vehicle is then to come to rest, the inter-shaft clutch is closed, clutch 21 is disengaged to unlock intermediate gear 4 from intermediate shaft 6 and hence stop drive going from the input shaft to the output shaft via intermediate shaft 6. The inter-shaft clutch can then be progressively opened as the vehicle comes to a halt, leaving intermediate shaft 6 stationary or essentially so.

The gearbox of FIG. 3 can provide upshifts whilst power flows continually from the input shaft to the output shaft. This can be done in the following way. The vehicle is being driven normally in, for illustration, first gear. The inter-shaft clutch is open, as are all of clutches 23, 25, 26. Clutches 21 and 22 are closed so that drive can go through drive gear 8. Clutch 24 is closed so intermediate shaft 7 is being driven from splitter gear 3. Suppose it is desired to shift up to a gear provided on the intermediate shaft that is not currently providing drive, for example second gear. The following steps are taken. Clutch 24 is disengaged to unlock the intermediate gear on the intermediate shaft for the new gear from that shaft. Clutch 25 is operated to lock the drive gear 12, for second gear, to intermediate shaft 7. A light load is applied to clutch 22 which is locking the current drive gear 8 to its intermediate shaft. That load is not sufficient to disengage that drive gear when it is under load, but will be sufficient to disengage it when it becomes unloaded. The inter-shaft clutch 70 is closed progressively. Since the new gear is of a higher ratio than the old gear, as drive is taken up through the clutch, gear 8 will become unloaded and clutch 22 will disengage under the light pre-load force. Once the inter-shaft clutch 70 is fully closed, the choice of ratios of gears 3, 4, 5, 61, 62, 63 and 64 means that at this point intermediate gear 5 is rotating at the same speed as intermediate shaft 7. Clutch 24 can therefore be readily closed, locking the input shaft 1 to intermediate shaft 7 through a route independent of the inter-shaft clutch 70. At that point the inter-shaft clutch can be opened. An analogous procedure can be used to upshift to and from other gears.

If an upshift is to be made when the output shaft is not driven, this can be done in the following way. The vehicle is being driven normally in, for illustration, first gear. The inter-shaft clutch is open, as are all of clutches 23, 25, 26. Clutches 21 and 22 are closed so that drive can go through first drive gear 8. Clutch 24 is closed so intermediate shaft 7 is being driven from splitter gear 3. Suppose it is desired to shift up to a gear provided on the intermediate shaft that is not currently providing drive, for example second gear 12 on intermediate shaft 7. The following steps are taken. The inter-shaft clutch 70 is closed. Clutch 21 is disengaged to unlock the intermediate gear 4 on the intermediate shaft 6 for the current gear from that shaft and to cause that shaft to be driven via the inter-shaft clutch 70 instead. The inter-shaft clutch 70 is opened slightly to permit it to slip, and the speed of the ICE driving the input shaft is allowed to fall. Once the intermediate shaft 7 for the new gear is rotating at the same speed as the drive gear 12 for the new gear, clutch 25 can be actuated to lock the drive gear for the new gear to its intermediate shaft. Then the inter-shaft clutch 70 can be opened fully, the clutch 22 for the previous gear can be operated to disengage the drive gear 8 for the previous gear from its intermediate shaft 6 and the clutch 21 can be actuated to lock the intermediate gear 4 for the intermediate shaft 6 of the previous gear to its intermediate shaft. An analogous procedure can be used to upshift to and from other gears.

If a downshift is to be made when the output shaft is driven, this can be done in the following way. The vehicle is being driven normally in, for illustration, third gear. The inter-shaft clutch is open, as are all of clutches 23, 25, 26. Clutches 21 and 22 are closed so that drive can go through drive gear 9. Clutch 24 is closed so intermediate shaft 7 is being driven from splitter gear 3. Suppose it is desired to shift down to a gear provided on the intermediate shaft that is not currently providing drive, for example second gear 12 on intermediate shaft 7. The following steps are taken. The inter-shaft clutch 70 is closed. Clutch 21 is disengaged to unlock the intermediate gear 4 on the intermediate shaft for the current gear 6 from that shaft and cause that shaft to be driven via the inter-shaft clutch 70 instead. The inter-shaft clutch 70 is opened slightly to permit it to slip, and the speed of the ICE driving the input shaft is caused to rise. Once the intermediate shaft 7 for the new gear is rotating at the same speed as the drive gear 12 for the new gear, clutch 25 can be actuated to lock the drive gear for the new gear to its intermediate shaft. Then the inter-shaft clutch 70 can be opened fully, the clutch 22 for the previous gear can be operated to disengage the drive gear 9 for the previous gear from its intermediate shaft 6 and the clutch 21 can be actuated to lock the intermediate gear 4 for the intermediate shaft 6 of the previous gear to its intermediate shaft. An analogous procedure can be used to downshift to and from other gears.

If a downshift is to be made when the output shaft is not driven, this can be done in the following way. The vehicle is being driven normally in, for illustration, third gear. The inter-shaft clutch is open, as are all of clutches 23, 25, 26. Clutches 21 and 22 are closed so that drive can go through drive gear 9. Clutch 24 is closed so intermediate shaft 7 is being driven from splitter gear 3. Suppose it is desired to shift down to a gear provided on the intermediate shaft that is not currently providing drive, for example second gear. The following steps are taken. Clutch 24 is disengaged to unlock the intermediate gear on the intermediate shaft for the new gear from that shaft. Clutch 25 is operated to lock the drive gear 12, for second gear, to intermediate shaft 7. A light load is applied to clutch 22 which is locking the current drive gear 9 to its intermediate shaft. That load is not sufficient to disengage that drive gear when it is under load, but will be sufficient to disengage it when it becomes unloaded. The inter-shaft clutch 70 is closed progressively. Since the new gear is of a lower ratio than the old gear, as drive is taken up through the clutch gear 9 will become unloaded and clutch 22 will disengage under the light pre-load force. Optionally, the point of torque reversal could be detected through some detection method (e.g. mechanical link, or torque sensor) and the gear disengaged at the appropriate torque level. Once the inter-shaft clutch 70 is fully closed, the choice of ratios of gears 3, 4, 5, 61, 62, 63 and 64 means that at this point intermediate gear 5 is rotating at the same speed as intermediate shaft 7. Clutch 24 can therefore be readily closed, locking the input shaft 1 to intermediate shaft 7 through a route independent of the inter-shaft clutch 70. At that point the inter-shaft clutch can be opened. An analogous procedure can be used to downshift to and from other gears.

The clutch 70 could be replaced by another mechanism that is capable of imposing speed synchronisation between the input shafts. That may be synchronisation with the speeds of the input shafts locked as being equal, as described above, or with appropriate choice of gear ratios it could be synchronisation with the speeds of the input shafts locked at some other unequal ratio relative to each other. One example of such a mechanism is a continuously variable transmission (CVT). Thus instead of clutch 70 gears 61 and 62 on the respective intermediate shafts could be interconnected by a CVT that imposes a certain speed relationship between the shafts. In comparison with a gearbox in which all the drive power is taken through a CVT, a gearbox of this type has a reduced total power capacity of the CVT, allowing the weight of and the wear on the CVT to be reduced. The CVT could be of any suitable known design.

The gearbox of FIG. 3 could have a transmission controller that is pre-programmed to set the dog clutches and the clutch 70 or CVT to operate in the manner described above, in response to inputs from a driver and, if desired, information on the state of the gearbox such as the rotation speed of the various shafts. Alternatively, any or all operations of the gearbox could be implemented manually.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

Summary of Operating Modes (a) each intermediate shaft can be coupled to the first shaft via a respective first torque path at any of a plurality of gear ratios, or the respective first torque path can be disengaged; and
(b) each intermediate shaft can be coupled to the second shaft via a respective second torque path, or the respective second torque path can be disengaged; and
a clutch arranged between the intermediate shafts and capable of coupling the intermediate shafts together independently of the first and second torque paths, wherein the gear ratio by which each intermediate shaft is linked to the clutch and the gear ratios of the respective second torque paths are such that when both interme-

|  |  | Intermediate shaft A | | | Intermediate shaft B | | | | | |
| --- | --- | --- | --- | --- | --- | --- | --- | --- | --- | --- |
| Mode | Function | Intermediate gear | Drive gears | Intermediate grounding | Intermediate gear | Drive gears | Intermediate grounding | ICE | Input motor | Shift motor |
| 1a | Input-only drive | Engaged | Only one engaged | Inactive | Engaged (or disengaged) | None engaged (or only one could be engaged if the shaft's intermediate gear is disengaged) | Inactive (or could be active if neither the intermediate gear nor any of the drive gears are engaged) | Active to drive intermediate shaft A (or could be inactive in favour of the input motor) | Inactive (or could supplement or replace the ICE) | Inactive |
| 1b | Input drive with shift motor | Engaged | Only one engaged | Inactive | Disengaged | Only one engaged | Inactive | Active to drive intermediate shaft A (or could be inactive in favour of the input motor) | Inactive (or could supplement or replace the ICE) | Active to add or recover energy in addition to the ICE (and/or input motor) |
| 2a | Shift motor-only drive | Disengaged | Only one engaged | Inactive | Disengaged | Only one engaged | Inactive | Inactive | Inactive | Active to drive or recover energy from output shaft |
| 2b | Grounded shift motor-only drive | Disengaged | Only one engaged | Inactive | Disengaged | None engaged | Active | Inactive | Inactive | Active to drive or recover energy from output shaft |
| 3 | Split-path CVT | Disengaged | Only one engaged | Inactive | Engaged | None engaged | Inactive | Active to drive intermediate shaft A (or could be inactive in favour of the input motor) | Inactive (or could supplement or replace the ICE in driving intermediate shaft A) | Active to modulate gearing ratio between intermediate shafts |
| 4a | Series hybrid mode | Disengaged | Only one engaged | Inactive | Disengaged | Only one engaged | Inactive | Active | Active to recover energy from input shaft | Active to drive or recover energy from output shaft |
| 4b | Grounded series hybrid mode | Disengaged | Only one engaged | Inactive | Disengaged | None engaged | Active | Active | Active to recover energy from input shaft | Active to drive or recover energy from output shaft |

The invention claimed is:

1. A gearbox comprising:
a first shaft and a second shaft, one of the first and second shafts being an input shaft for receiving a drive torque and the other being an output shaft for providing a drive torque;
two intermediate shafts by means of which the first and second shafts can be coupled together, each intermediate shaft being arranged so that:

diate shafts are coupled to the second shaft via the respective second torque path the speed difference across the clutch is zero.

2. A gearbox as claimed in claim 1, wherein the clutch is capable of coupling the intermediate shafts together with a controllable degree of slip therebetween.

3. A gearbox as claimed in claim 1, wherein the clutch is a friction clutch.

4. A gearbox as claimed in any of claim 1, wherein the gear ratios with which each intermediate shaft can be coupled to the first shaft are such that the intermediate shafts can collectively couple the second shaft to the first shaft independently of the clutch at a range of gear ratios, successive ratios in that range being provided by alternate ones of the intermediate shafts.

5. A gearbox as claimed in claim 4, wherein the respective first torque paths each comprise a respective gear which can be rotationally coupled to a respective one of the intermediate shafts by means of a respective coupling mechanism.

6. A gearbox as claimed in claim 5, wherein each coupling mechanism is such that, when the respective gear of each coupling mechanism is transmitting torque to or from each respective gear's respective shaft, the coupling mechanism is loaded so as to resist disengagement of the coupling mechanism, the gearbox being configured so as to, when desirable to shift from a first gear ratio provided by a first one of the said gears on one intermediate shaft to a second gear ratio provided by a second one of the said gears on the other intermediate shaft, apply a light release load to the coupling mechanism of the first gear, the light load being insufficient to cause unlocking of the first gear when the first gear is transmitting torque, but sufficient to cause unlocking of the first gear when the first gear becomes unloaded due to drive being taken up through the clutch as the shift is made.

7. A gearbox as claimed in claim 5, wherein the coupling mechanism is capable of applying a torque between one of said two intermediate shafts and the first shaft in only a single direction.

8. A gearbox as claimed in claim 7, wherein the coupling mechanism is a further clutch and an engagement mechanism for engaging and disengaging the further clutch, the further clutch and the engagement mechanism being capable of operating in:
a first clutch mode in which the coupling mechanism is capable of applying a torque between one of said two intermediate shafts and the first shaft in both directions;
a second clutch mode in which the coupling mechanism is capable of applying a torque between one of said two intermediate shafts and the first shaft in only a single direction; and
a third clutch mode in which the coupling mechanism is capable of applying a torque between one of said two intermediate shafts and the first shaft in neither direction.

9. A gearbox as claimed in claim 8, wherein the further clutch is a dog clutch.

10. A gearbox as claimed in claim 6, wherein the coupling mechanism is capable of applying a torque between one of said two intermediate shafts and the first shaft in only a single direction.

11. A gearbox as claimed in claim 10, wherein the coupling mechanism is a further clutch and an engagement mechanism for engaging and disengaging the further clutch, the further clutch and the engagement mechanism being capable of operating in:
a first clutch mode in which the coupling mechanism is capable of applying a torque between one of said two intermediate shafts and the first shaft in both directions;
a second clutch mode in which the coupling mechanism is capable of applying a torque between one of said two intermediate shafts and the first shaft in only a single direction; and
a third clutch mode in which the coupling mechanism is capable of applying a torque between one of said two intermediate shafts and the first shaft in neither direction.

12. A gearbox as claimed in claim 11, wherein the further clutch is a dog clutch.

13. A gearbox as claimed in claims 1, wherein a first plate of the clutch arranged between the intermediate shafts is coupled to one of the intermediate shafts, and a second plate of that clutch is coupled to the other of the intermediate shafts.

14. A gearbox as claimed in claim 1, wherein the first shaft is the output shaft and the second shaft is the input shaft.

15. A gearbox comprising:
a first shaft and a second shaft, one of the first and second shafts being an input shaft for receiving a drive torque and the other being an output shaft for providing a drive torque;
two intermediate shafts by means of which the first and second shafts can be coupled together, each intermediate shaft being arranged so that:
(a) each intermediate shaft can be coupled to the first shaft via a respective first torque path at any of a plurality of gear ratios, or the respective first torque path can be disengaged; and
(b) each intermediate shaft can be coupled to the second shaft via a respective second torque path, or the respective second torque path can be disengaged; and
a speed synchronisation mechanism arranged between the intermediate shafts and capable of imposing speed synchronisation on the intermediate shafts independently of the first and second torque paths.

16. A gearbox as claimed in claim 15, wherein the speed synchronisation mechanism is a continuously variable transmission.

17. A gearbox as claimed in claim 15, wherein the speed synchronisation mechanism is a clutch.

18. A gearbox as claimed in claim 15, wherein the speed synchronisation mechanism is capable of urging the intermediate shafts towards a set speed ratio.

19. A gearbox as claimed in claim 15, wherein the speed synchronisation mechanism is capable of imposing a set speed ratio between the intermediate shafts.

20. A gearbox as claimed in claim 15, comprising a controller arranged to, when drive is passing from the input shaft to the output shaft via a first gear ratio on a first one of the intermediate shafts, cause the gearbox to perform an upshift by the steps of:
engaging a second gear ratio between the second intermediate shaft and the first shaft whilst the second intermediate shaft is disengaged from the second shaft;
subsequently imposing speed synchronisation between the first and second intermediate shafts by means of the speed synchronisation mechanism;
subsequently disengaging the first gear ratio when drive is taken up at the second gear ratio; and
subsequently disengaging the first intermediate shaft from the second shaft, engaging the second intermediate shaft with the second shaft and ceasing to impose synchronisation between the first and second intermediate shafts by means of the speed synchronisation mechanism.

21. A gearbox comprising:
a first shaft and a second shaft, one of the first and second shafts being an input shaft for receiving a drive torque and the other being an output shaft for providing a drive torque;
two intermediate shafts by means of which the first and second shafts can be coupled together, each intermediate shaft being arranged so that:

(a) each intermediate shaft can be coupled to the first shaft via a respective first torque path at any of a plurality of gear ratios, or the respective first torque path can be disengaged; and (b) each intermediate shaft can be coupled to the second shaft via a respective second torque path, or the respective second torque path can be disengaged; and a differential torque device coupled between the intermediate shafts, the differential torque device being capable of transmitting a differential torque between the intermediate shafts and a coupling that can be actuated to hold one of the intermediate shafts stationary.

22. A gearbox as claimed in claim 21, wherein the differential torque device is a differential gear device.

23. A gearbox as claimed in claim 22, wherein the differential gear device is coupled to a torque provider/absorber.

24. A gearbox as claimed in claim 23, wherein the differential gear device has a first element coupled to the first intermediate shaft, a second element coupled to the second intermediate shaft and a third element coupled to the torque provider/absorber, the first, second and third elements being geared together so that by the torque provider/absorber providing/absorbing torque the differential torque device can transfer torque across a speed difference between the intermediate shafts.

25. A gearbox as claimed in claim 24, wherein the first element is one of a sun wheel and an outer ring, the second element is the other of the sun wheel and the outer ring and the third element is a planet cage carrying planet gears that engage the sun wheel and the outer ring.

26. A gearbox as claimed in claim 24, wherein the torque provider/absorber comprises a first motor.

27. A gearbox as claimed in claim 26, wherein the torque provider/absorber comprises a clutch whereby the first motor can be selectively decoupled from the differential torque device.

28. A gearbox as claimed in claim 24, wherein the torque provider/absorber comprises a brake.

29. A gearbox as claimed in claim 21, having an internal combustion engine ("ICE") coupled to the input shaft to provide a drive torque thereto.

30. A gearbox as claimed in claim 21, having a second motor coupled to the second shaft to provide a drive torque thereto and/or receive a drive torque therefrom.

31. A gearbox as claimed in claim 24, wherein the torque provider/absorber comprises a first motor; and wherein the first and second motors are electric motors.

32. A gearbox as claimed in claim 21, wherein the first and second motors are hydraulic motors.

33. A gearbox as claimed in claim 21, wherein the gear ratios with which each intermediate shaft can be coupled to the first shaft are such that the intermediate shafts can collectively couple the second shaft to the first shaft independently of the differential torque device at a range of gear ratios, successive ratios in that range being provided by alternate ones of the intermediate shafts.

34. A gearbox as claimed in claim 21, further comprising a clutch arranged between the intermediate shafts and capable of coupling the intermediate shafts together independently of the first and second torque paths.

35. A gearbox as claimed in claim 34, wherein the clutch is a slippable clutch and constitutes the differential torque device.

36. A gearbox as claimed in claim 24, wherein the torque provider/absorber is coupled to the differential torque device via a clutch.

37. A gearbox as claimed in claim 21, comprising a coupling mechanism for coupling one of the intermediate shafts to the first shaft at a gear ratio, the coupling mechanism being capable of applying a torque between one of said two intermediate shafts and the first shaft in only a single direction.

38. A gearbox as claimed in claim 37, wherein the coupling mechanism is a clutch and an engagement mechanism for engaging and disengaging the clutch, the clutch and the engagement mechanism being capable of operating in:

a first clutch mode in which the coupling mechanism is capable of applying a torque between one of said two intermediate shafts and the first shaft in both directions;

a second clutch mode in which the coupling mechanism is capable of applying a torque between one of said two intermediate shafts and the first shaft in only a single direction; and a third clutch mode in which the coupling mechanism is capable of applying a torque between one of said two intermediate shafts and the first shaft in neither direction.

39. A gearbox as claimed in claim 38, wherein the clutch is a dog clutch.

40. A gearbox as claimed in claim 34, wherein the clutch is capable of coupling the intermediate shafts together with a controllable degree of slip therebetween.

41. A gearbox as claimed in claim 34, wherein the clutch is a friction clutch.

42. A gearbox as claimed in any of claim 34, wherein the gear ratios with which each intermediate shaft can be coupled to the first shaft are such that the intermediate shafts can collectively couple the second shaft to the first shaft independently of the clutch at a range of gear ratios, successive ratios in that range being provided by alternate ones of the intermediate shafts.

43. A gearbox as claimed in claim 42, wherein the respective first torque paths each comprise a respective gear which can be rotationally coupled to a respective one of the intermediate shafts by means of a respective coupling mechanism.

44. A gearbox as claimed in claim 43, wherein each coupling mechanism is such that, when the respective gear of each coupling mechanism is transmitting torque to or from each respective gear's respective shaft, the coupling mechanism is loaded so as to resist disengagement of the coupling mechanism, the gearbox being configured so as to, when desirable to shift from a first gear ratio provided by a first one of the said gears on one intermediate shaft to a second gear ratio provided by a second one of the said gears on the other intermediate shaft, apply a light release load to the coupling mechanism of the first gear, the light load being insufficient to cause unlocking of the first gear when the first gear is transmitting torque, but sufficient to cause unlocking of the first gear when the first gear becomes unloaded due to drive being taken up through the clutch as the shift is made.

45. A gearbox as claimed in claim 43, wherein the coupling mechanism is capable of applying a torque between one of said two intermediate shafts and the first shaft in only a single direction.

46. A gearbox as claimed in claim 45, wherein the coupling mechanism is a further clutch and an engagement mechanism for engaging and disengaging the further clutch, the further clutch and the engagement mechanism being capable of operating in:

a first clutch mode in which the coupling mechanism is capable of applying a torque between one of said two intermediate shafts and the first shaft in both directions;

a second clutch mode in which the coupling mechanism is capable of applying a torque between one of said two intermediate shafts and the first shaft in only a single direction; and a third clutch mode in which the coupling mechanism is capable of applying a torque between one of said two intermediate shafts and the first shaft in neither direction.

47. A gearbox as claimed in claim 46, wherein the further clutch is a dog clutch.

48. A gearbox as claimed in claim 44, wherein the coupling mechanism is capable of applying a torque between one of said two intermediate shafts and the first shaft in only a single direction.

49. A gearbox as claimed in claim 47, wherein the coupling mechanism is a further clutch and an engagement mechanism for engaging and disengaging the further clutch, the further clutch and the engagement mechanism being capable of operating in:

a first clutch mode in which the coupling mechanism is capable of applying a torque between one of said two intermediate shafts and the first shaft in both directions;

a second clutch mode in which the coupling mechanism is capable of applying a torque between one of said two intermediate shafts and the first shaft in only a single direction; and a third clutch mode in which the coupling mechanism is capable of applying a torque between one of said two intermediate shafts and the first shaft in neither direction.

50. A gearbox as claimed in claim 48, wherein the further clutch is a dog clutch.

51. A gearbox as claimed in claim 34, wherein a first plate of the clutch arranged between the intermediate shafts is coupled to one of the intermediate shafts, and a second plate of that clutch is coupled to the other of the intermediate shafts.

52. A gearbox as claimed in claim 21, wherein the first shaft is the output shaft and the second shaft is the input shaft.

* * * * *

UNITED STATES PATENT AND TRADEMARK OFFICE
CERTIFICATE OF CORRECTION

PATENT NO.        : 9,759,290 B2
APPLICATION NO.   : 14/417503
DATED             : September 12, 2017
INVENTOR(S)       : Glover et al.

It is certified that error appears in the above-identified patent and that said Letters Patent is hereby corrected as shown below:

On the Title Page

"(72) Inventors: Antony Richard Glover, Woking (GB);
              Richard Hopkirk, Woking (GB)"
Should read:
--(72) Inventors: Antony Richard Glover, Woking, Surrey (GB);
              Richard Hopkirk, Woking, Surrey (GB)--

Signed and Sealed this
Twenty-sixth Day of June, 2018

Andrei Iancu
*Director of the United States Patent and Trademark Office*